United States Patent [19]

Keegan et al.

[11] 3,868,259
[45] Feb. 25, 1975

[54] DENTURE ADHESIVE PREPARATION

[75] Inventors: James J. Keegan, Bloomfield; Howard Rubin, Rockaway, both of N.J.; Ram N. Gidwani, Edmonton, Alberta, Canada

[73] Assignee: Warner-Lambert Company, Morris Plains, N.J.

[22] Filed: June 5, 1974

[21] Appl. No.: 476,623

Related U.S. Application Data

[63] Continuation-in-part of Ser. No. 243,816, April 13, 1972, Pat. No. 3,833,518.

[52] U.S. Cl. ............................ 106/35, 260/DIG. 36
[51] Int. Cl. .......................................... C08b 21/32
[58] Field of Search ............... 260/13, 231, DIG. 36; 106/35

[56] References Cited
UNITED STATES PATENTS

| | | | |
|---|---|---|---|
| 2,997,399 | 8/1961 | Eberhard et al. | 106/35 |
| 3,440,065 | 4/1969 | La Via | 106/35 |
| 3,472,840 | 10/1969 | Stone et al. | 260/231 R |
| 3,511,791 | 5/1970 | Puetzer et al. | 106/35 X |
| 3,736,274 | 5/1973 | Schoenholz et al. | 260/17 R |

*Primary Examiner*—Melvin Goldstein
*Assistant Examiner*—W. C. Danison
*Attorney, Agent, or Firm*—Albert H. Graddis; Frank S. Chow; Anne M. Kelly

[57] ABSTRACT

An improved anhydrous denture adhesive is prepared to contain a mixture of a cationic polymeric material and a synthetic antionic gum material as the adhesive ingredient. The mixture may be formulated as a powder or anhydrous paste, which, when applied to dentures and exposed to moisture, develops superior adhesive properties. Suitable cationic materials include at least one O-lower alkyl-trimethylammonium chloride-substituted-anhydroglucose polymer. As the anionic component there may be used at least one synthetic gum including carboxymethyl celluloses and cellulose sulfates.

8 Claims, No Drawings

DENTURE ADHESIVE PREPARATION

CROSS REFERENCE TO RELATED APPLICATION

This application is a continuation-in-part of U.S. Ser. No. 243,816, filed Apr. 13, 1972, now U.S. Pat. No. 3,833,518.

BACKGROUND OF THE INVENTION

Traditionally, adherent powders used to secure dentures within the mouth were prepared from such materials as finely powdered natural gums, i.e., karaya, acacia or tragacanth gum. These materials have the particular property of swelling to many times their original volume upon the addition of water to form a gelatinous or mucilaginous mass. Denture adhesive powders may be a combination of one or more natural gums, generally flavored with pleasant tasting volatile oils. Many other additives may also be included, such as antiseptics, stablizers, bactericides, special deodorants, plasticizing agents, fillers, coloring agents, and the like.

Cream forms of the denture adherent, prepared from finely ground particles of the natural gums dispersed in a cream base, are also available and may be used instead of the powder compositions. In any event, when wet with water, the natural gum in either the cream or powder formulation, expands to become a viscous gel which acts as a cushion and an adherent between the denture plate and the gum tissue.

While these relatively simple formulations are effective in securing dentures within the oral cavity for a short period of time, generally more than one application of the adhesive per day is necessary. This is, at best, inconvenient and therefore, most undesirable.

In recent years, there have been numerous improvements in the above described simple denture adhesive formulations. For example, in U.S. Pat. No. 3,003,988, a water insoluble, water-sensitized copolymer is disclosed as the adhesive or stablizing component of a denture composition. Actually, this patent discloses mixed, partial salts of copolymers of maleic anhydride with lower alkyl-vinyl-ethers, and partial esters of these salts, as the adhesive material. For example, the calcium-sodium partial salts of a partial isopropyl ester of methyl vinyl ether/maleic anhydride copolymer is said to provide a superior denture adhesive.

In U.S. Pat. No. 2,997,399, the principal ingredient of the denture adhesive is a hydroxyethyl cellulose having a certain degree of substitution of ethylene oxide groups per anhydro-glucose unit of the cellulose molecule; preferably, there is also present a lower alkyl ether of cellulose, such as methylether of cellulose, exhibiting temperature-dependent viscosity properties, i.e., showing an increase in viscosity with an increase in temperature. As an optional ingredient in the denture adhesive of U.S. Pat. No. 2,997,399, there may be used a polyacrylamide. This optional ingredient is said to produce an improved "feel," "texture," or "body" in the denture adhesive.

U.S. Pat. No. 3,440,065 discloses still another denture adhesive wherein a powdered, insoluble absorptive cellulose material, such as alpha cellulose, wood flour or microcrystalline cellulose, is incorporated into a gum-petrolatum base adhesive. As the gum in the adhesive, sodium carboxymethyl cellulose, hydroxyether cellulose, karaya gum, guar gum, tragacanth and mixtures thereof are suggested.

Another improvement over conventional denture adhesives is claimed in U.S. Pat. No. 3,511,791, which teaches that copolymers of acrylamide and acrylic acid, or homopolymers of acrylamide can form the principle adhesive component in a denture adherent to provide sustained adherence in use without swelling. Whenever a homopolymer of acrylamide, which is nonionic in character, is used, gum karaya is added to the fomulation in order to provide a synergistic improvment in gel strength and adhesiveness.

Further, U.S. Pat. No. 3,575,915 discloses a superior denture adhesive containing polyvinyl acetate, water, ethanol, a mineral hydrocolloid, such as colloidal silicate, and a plasticizer.

U.S. Pat. No. 2,978,812 discloses the addition of ethylene oxide homopolymers to denture adhesive gums, including cellulose derivatives, to improve adhesive qualities.

U.S. Pat. No. 3,736,274 discloses a denture adhesive containing three essential ingredients: a maleic anhydride and/or acid copolymer (with a lower alkyl vinyl ether), a polymeric N-vinyl lactam, and sodium carboxymethyl cellulose.

While all of the above denture adhesives provide some improvement over simple formulations containing only finely powdered natural gums, it is generally recognized that no one product has yet been developed which can accommodate, over a long period of time, the many variations in temperature, pH and mechanical agitation which are quite normal in the oral cavity.

It has now been found that the denture adhesive of this invention will provide superior adherent properties over prolonged periods of time and under unusually varied conditions, without the disadvantages characteristic of previously known products.

SUMMARY OF THE INVENTION

An anhydrous denture adhesive comprises a mixture of a cationic polymeric component and an anionic synthetic gum component which, when applied to dentures and exposed to moisture, develops adhesive properties. Suitable cationic materials include at least one O-lower alkyl-trimethylammonium chloride-substituted-anhydroglucose polymer. As the anionic component there may be used at least one synthetic gum including carboxymethyl celluloses and cellulose sulfates. In the preferred products of the invention, and the anionic component is a carboxymethyl cellulose gum.

DESCRIPTION OF THE INVENTION

This invention relates to an anhydrous denture adhesive, which, when in contact with moistened denture plates and the saliva, hydrates within the oral cavity to provide superior adherent properties. The principal adhesive force develops when the mixture of the anhydrous cationic polymeric component and the anhydrous anionic gum material is exposed to moisture. The cationic polymeric component suitable for use in the practice of this invention is at least one O-lower alkyl-trimethyl-ammonium chloride-substituted-anhydroglucose polymer described generally in U.S. Pat. No. 3,472,480 as having the formula:

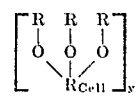

wherein $R_{Cell}$ is the residue of an anhydroglucose unit, $y$ is an integer having a value of from about 50 to about 20,000, and each R individually represents a substituent group of the general formula:

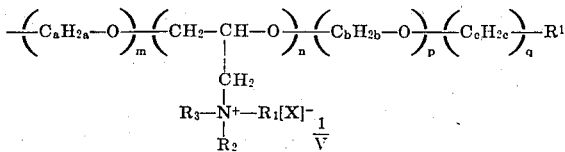

wherein:
$a$ is an integer having a value of from 2 to 3;
$b$ is an integer having a value of from 2 to 3;
$c$ is an integer having a value of from 1 to 3;
$m$ is an integer having a value of from zero to 10;
$n$ is an integer having a value of from zero to 3;
$p$ is an integer having a value of from zero to 10;
$q$ is an integer having a value of from zero to 1;
R' is a member selected from the group consisting of

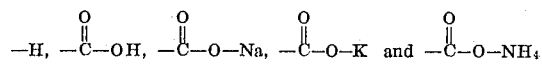

with the proviso that when $q$ is zero then R' is –H; $R_1$, $R_2$ and $R_3$, taken individually, represent a member selected from the group consisting of alkyl, aryl, aralkyl, alkaryl, cycloalkyl, alkoxyalkyl and alkoxyaryl radicals where each of $R_1$, $R_2$ and $R_3$ can contain up to 10 carbon atoms, with the proviso that when said member is an alkoxyalkyl radical there are at least 2 carbon atoms separating the oxygen atom from the nitrogen atom, and with the further proviso that the total number of carbon atoms in radicals represented by $R_1$, $R_2$ and $R_3$ is from 3 to 12 with the further proviso that when $R_1$, $R_2$ and $R_3$ are taken together the nitrogen atom to which $R_1$, $R_2$ and $R_3$ are attached can be component of a heterocyclic ring selected from the group consisting of pyridine, α-methylpyridine, 2,5-dimethylpyridine, 2,4,6-trimethylpyridine, N-methylpiperidine, N-ethyl piperidine, N-methyl morpholine and N-ethyl morpholine; X is an anion; V is an integer which is equal to the valence of X; the average value of n per anhydroglucose unit of said cellulose ether is from about 0.01 to about 1; and the average value of $m+p+q$ per anhydroglucose unit of said cellulose ether is from about 0.01 to about 4.

In the aforementioned formula for the cationic polymer, preferred cationic polymers for use in the denture adhesive of this invention are obtained when $y$ is an integer having a value of from about 1,000 to about 5,000 and each R individually represents a substituent group of the general formula:

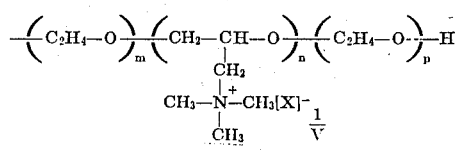

wherein:

$m$ is an integer having a value of from zero to 10;
$n$ is an integer having a value of from zero to 3;
$p$ is an integer having a value of from zero to 10;
X is an anion; V is an integer which is equal to the valence of X; the average value of $n$ per anhydroglucose unit of the cellulose ether is from 0.01 to 1; and the average value of $m+p$ per anhydroglucose unit of the cellulose ether is from 0.01 to 4.

Especially preferred cationic polymers are those in which X is chlorine, the average value of n per anhydroglucose unit of the cellulose ether is from 0.1 to 0.5, and the average value of $m+p$ per anhydroglucose unit of the cellulose ether is from 0.1 to 2.5. A particularly preferred O-alkyl-trimethylammonium chloride-substituted-anhydroglucose polymer of this type is commercially available as Polymer JR-400 from Union Carbide Corporation, New York, N.Y. Polymer JR-400 is water soluble and, at a concentration of 1% and a temperature of 25°C, yields a solution having a viscosity of 400 centipoises.

As the anionic ingredient of the denture adhesive of this invention, there may be used one or more synthetic gums, that is, one or more of the carboxymethylcellulose gums or the cellulose sulfate gums. The carboxymethylcellulose gums are particularly preferred, especially the sodium carboxymethylcellulose gums.

The sodium carboxymethylcellulose gums are water soluble, anionic, long chain polymers, derived from cellulose. Properties vary with the average number of carboxy methyl groups that are substituted per anhydroglucose unit in each cellulose molecule. This property is generally reffered to as "the degree of substitution," with the maximum substitution possible designated as "3.0" since there are just three hydroxy groups capable of reaction in each anhydroglucose unit. For the practice of this invention, it has been found that one or more cellulose gums having a degree of substitution of from .4 to 1.2 is suitable. The viscosity of 1% solution of the gum, measured at 25°C, should be in the range of from about 100 to 20,000 centipoises.

Sodium carboxymethylcellulose gums of this type are more fully described in "Chemical and Physical Properties: Cellulose Gum," 1968, published by Hercules, Incorporated, Cellulose and Protein Products Department, 910 Market Street, Wilmington, Del. 19899.

The particle size of the cellulose gum is also important and should be predominantly of a fine grain, that is, of a size such that at least 80% of the particles pass through a 200 mesh screen, while only 0.5% of the particles are retained on a 60 mesh screen. A lesser amount of the cellulose gum may be of regular grade, having particles of a size such that no more than 5% are retained on a 40 mesh screen, while only 1% are retained on a 30 mesh screen. A particularly advantageous gum component for use in the denture adhesive of this invention has been found to be sodium carboxymethylcellulose gums, of different particle size, but within the above-stated range. This combination of gums may also be of a different degree of substitution, but, again, within the above stated range.

The denture adhesive of this invention may be formulated to contain the cationic polymer and the anionic gum in either powder or paste form. In the powder formulation, the two anhydrous, particulate, components are admixed with the usual flavors and colorants in the following proportions: for the cationic polymer, from 1% to 80%, preferably from 3% to 50% by weight, based on the weight of the total formulation is suitable; for the anion source, from 20% to 99%, preferably from 30% to 90%, by weight, based on the weight of the total formulation may be used. Other ingredients such as non-toxic anti-caking agents, (silica, magnesium stearate, talcum powder or the like) may also be included. The mixture of ingredients is thoroughly agitated or stirred to yield a generally homogenous intermixing of all components.

In the past formulations, the cationic polymer and the anionic gum are paste formulations, with petrolatum, mineral, animal or vegetable oils, and the like, along with flavors, colorants and certainly commonly used preservatives and fillers.

A particularly preferred paste or cream formulation is prepared by utilizing as the cream or paste base, the product of U.S. Pat. No. 3,215,599. The cream or paste base of this patent is characterized as a mixture of white petroleum oil with a minor amount of polyethylene wax having an average molecular weight of 1,000 to 20,000. This product is described as having emollient properties, useful in the formulation of medicaments where absorption of the medicament by the skin is of paramount importance. Denture adhesive creams formulated with this petroleum oil/polyethylene wax blend as the paste or cream base display unusually good stability, extrudability and product appearance. The successful use of a "cosmetic" or "medicinal" vehicle in the denture adhesive of the invention, to provide a cream formulation of improved properties is most unexpected.

Concentrations of ingredients in a cream or paste denture adhesive are as follows: for the cationic polymer, from 1% to 40%, preferably 5% to 25% by weight based on the weight of the total formulation; for the anion source, from 15% to 50%, preferably 25% to 40% by weight based on the weight of the total formulation; and for the cream base, from 30% to 65%, preferably 40% to 60% by weight, based on the weight of the total formulation. In the aforementioned particularly preferred cream formulation utilizing the petroleum oil with polyethylene wax blend of U.S. Pat. No. 3,215,599, the petroleum oil and the polyethylene wax are used in amounts of from 3% to 20%, preferably 5% to 15% of polyethylene wax and 80% to 97%, preferably 85% to 95% by weight of petroleum oil, based on the total weight of the cream or paste base in the denture adhesive formulation.

Whether formulated as a powder or paste, the denture adhesive mixture of this invention, when applied to dentures and exposed to moisture, hydrates to form an adhesive combination markedly superior to prior art, preformed adhesive materials.

In order to further illustrate this invention, the following examples are given:

EXAMPLE 1

Preparation of Denture Adhesive Cream

A. Weight 43.25 pounds of heavy mineral oil into a steam-jacketed Hobart mixer and heat to 90°C. At 90°C, add 6.5 pounds of a polyethylene wax of average molecular weight 2,000, and disperse the wax thoroughly in the mineral oil while force cooling the batch to 70°C during mixing. At 70°C, add 0.10 pounds of methyl paraben and 0.15 pounds of propyl paraben, and mix well, while force cooling the batch to 45°C.

B. In a Hobart mixer, add 10 pounds of Polymer JR; 5 pounds of a sodium carboxymethylcellulose gum with a degree of substitution of 0.4 and a viscosity of 400 to 1,000 centipoises; 35 pounds of a sodium carboxymethylcellulose gum with a degree of substitution of .7 and a viscosity of 1,300 to 2,200 centipoises; and 0.125 pounds of FD and C Red No. 3 Lakolene (19% pure dye); mix these dry ingredients until complete blending is achieved. At 45°C, add B to A and mix for about 15 minutes with the Hobart blades.

C. Add 0.10 pounds of peppermint oil, U.S.P. to the mixture of A and B and mix at a high speed until a homogeneous cream is obtained.

EXAMPLE 2

Preparation of Denture Adhesive Cream

A denture adhesive cream is prepared from the following ingredients:

| | | |
|---|---|---|
| Polymer JR | 15.5 | pounds |
| Sodium carboxymethyl cellulose gum (Degree of substitution 0.7) | 19.5 | pounds |
| Sodium carboxymethyl cellulose gum (Degree of substitution 0.12) | 15.0 | pounds |
| Petrolatum | 49.75 | pounds |
| Methyl paraben | 0.05 | pounds |
| Propyl paraben | 0.20 | pounds |
| Peppermint Oil | 0.1 | pounds |
| F.D. &. C. Red No. 3 Aluminum Lake | .01 | pounds |

The petrolatum is added to a steam-jacketed Hobart mixer and heated to 70°C. At 70°C, the methyl paraben and the propyl paraben are added, mixed well and the mixture is force-cooled to 45°C. The procedure of Example 1, parts B and C, is followed for all of the remaining ingredients.

EXAMPLE 3

Preparation of Denture Adhesive Powder

A denture adhesive powder is prepared to contain the following ingredients:

| | | |
|---|---|---|
| Polymer JR | 20 | pounds |
| Sodium carboxymethyl cellulose (Degree of substitution 0.4) | 10 | pounds |
| Sodium carboxymethyl cellulose (Degree of substitution 0.7) | 25 | pounds |
| Dicalcium phosphate dihydrate | 44 | pounds |
| Cab-O-Sil M-5 | 1 | pound |
| Peppermint Oil | 0.1 | pound |

The peppermint oil is well dispersed in 25 pounds of the sodium carboxymethyl cellulose.

The dicalcium phosphate dihydrate and the Cab-O-Sil M-5 are similarly dispersed in the remaining sodium carboxymethyl cellulose.

The two premixes are then placed in a ribbon blender mixing apparatus. The whole is mixed for about 15 minutes, after which the 20 pounds of the Polymer JR is added and the batch mixed for an additional 15 minutes.

EXAMPLE 4

Preparation of Denture Adhesive Powder

A denture adhesive powder is prepared, according to the procedure of Example 3, from the following ingredients:

| | | |
|---|---|---|
| Polymer JR | 25 | pounds |
| Cellulose sulfate | 40 | pounds |

| | | |
|---|---|---|
| -Continued | | |
| Dicalcium phosphate dihydrate | 35 | pounds |
| Anise Oil | 0.1 | pound |

We claim:

1. A denture adhesive comprising a substantially anhydrous mixture of:

A. from about 1.0% to about 80% by weight, based on the total weight of the denture adhesive, of at least one cationic polymeric material having the formula:

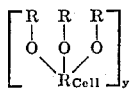

wherein $R_{Cell}$ is the residue of an anhydroglucose unit, y is an integer having a value of from about 1,000 to about 5,000, and each R individually represents a substituent group of the general formula:

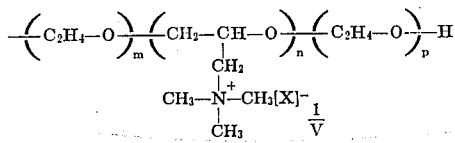

wherein:

m is an integer having a value of from zero to 10;
n is an integer having a value of from zero to 3;
p is an integer having a value of from zero to 10;
X is an anion; V is an integer which is equal to the valence of X; the average value of n anhydroglucose unit of said cellulose ether is from about 0.01 to about 1; and the average value of m+p per anhydroglucose unit of said cellulose ether is from about 0.01 to about 4; and B. from about 20% to about 99% by weight, based on the total weight of the denture adhesive, of at least one anionic gum selected from the group consisting of carboxymethylcellulose gum and cellulose sulfate gum.

2. A denture adhesive according to calim 1 wherein, in the cationic polymeric material of (A) X is chlorine, the average value of n per anhydroglucose unit of said cellulose ether is from about 0.1 to about 0.5, and the average value of m+p per anhydroglucose unit of said cellulose ehter is from about 0.1 to about 2.5.

3. A denture adhesive according to claim 2 comprising a substantially anhydrous mixture of from about 3.0% to about 50% by weight of the cationic polymeric material, and from about 30% to about 90% by weight of the anionic gum.

4. A denture adhesive according to claim 3 wherein the anionic gum is a carboxymethylcellulose gum.

5. A denture adhesive according to claim 4 wherein the anionic gum is at least one sodium caboxymethylcellulose gum.

6. A denture adhesive according to claim 1 which additionally contains from about 10% to about 75% by weight, based on the weight of the total denture adhesive compositions of non-toxic, powdered, excipient materials.

7. A denture adhesive according to claim 1 which additionally contains from about 30% to about 75% by weight, based on the weight of the total denture adhesive composition of at least one cream base material selected from the group consisting of petrolatum, natural and synthetic oils.

8. A denture adhesive according to claim 1 which additionally contains from about 30% to about 75% by weight, based on the weight of the total denture adhesive composition, of a cream base material which is a combination of mineral oil with a minor amount of a polyethylene wax having a molecular weight of 1,000 to 20,000.

* * * * *